US008885121B2

(12) United States Patent
Quintana Arregui et al.

(10) Patent No.: US 8,885,121 B2
(45) Date of Patent: Nov. 11, 2014

(54) PROCEDURE AND DEVICE OF DOCUMENTAL SECURITY BASED ON GENERATION OF MULTIPLE IMAGES

(75) Inventors: Xabier Quintana Arregui, Madrid (ES); Jose Manuel Oton Sanchez, Madrid (ES); Morten Andreas Geday, Madrid (ES); Carlos Carrasco Vela, Madrid (ES)

(73) Assignee: Universidad Politecnica de Madrid, Madrid (ES)

( * ) Notice: Subject to any disclaimer, the term of this patent is extended or adjusted under 35 U.S.C. 154(b) by 231 days.

(21) Appl. No.: 13/513,517

(22) PCT Filed: Nov. 12, 2010

(86) PCT No.: PCT/ES2010/000461
§ 371 (c)(1),
(2), (4) Date: Aug. 17, 2012

(87) PCT Pub. No.: WO2011/098626
PCT Pub. Date: Aug. 18, 2011

(65) Prior Publication Data
US 2012/0300156 A1    Nov. 29, 2012

(30) Foreign Application Priority Data
Dec. 1, 2009   (ES) .................................. 200931088

(51) Int. Cl.
| G02F 1/1333 | (2006.01) |
| G02F 1/1337 | (2006.01) |
| G02F 1/1335 | (2006.01) |
| G02F 1/1343 | (2006.01) |
| B41M 5/00 | (2006.01) |
| G07D 7/12 | (2006.01) |
| C09K 19/60 | (2006.01) |
| B41M 3/14 | (2006.01) |

(52) U.S. Cl.
CPC *C09K 19/60* (2013.01); *G07D 7/12* (2013.01); *B41M 3/148* (2013.01)
USPC ............. 349/85; 349/123; 349/141; 349/117; 427/145

(58) Field of Classification Search
CPC ................ G02F 1/141; G02F 2203/30; G02F 2001/134345; G02F 1/136213; G02F 1/1337; G02F 1/133711; G02F 1/134363; G09G 3/202
USPC ..................... 349/85, 123, 141, 117; 427/145
See application file for complete search history.

(56) References Cited

U.S. PATENT DOCUMENTS 5,731,116 A * 3/1998 Matsuo et al. .................. 430/56
6,906,423 B1 * 6/2005 Asakawa et al. .............. 257/775

(Continued)

FOREIGN PATENT DOCUMENTS

| EP | 1 227 347 | 7/2002 |
| EP | 1 894 736 | 3/2008 |

(Continued)

OTHER PUBLICATIONS

International Search Report for International Application No. PCT/ES2010/000461 mailed Feb. 22, 2011.

(Continued)

*Primary Examiner* — Mike Qi
(74) *Attorney, Agent, or Firm* — Merchant & Gould P.C.

(57) ABSTRACT

A novel document security and authentication system is based on a transparent element on which more than one image appears depending on the manner in which the element is viewed. The system is based on cells or sheets of liquid crystal doped with one or more dichroic dyes. The images obtained with the aid of a polarizer can be printed onto a very thin (μm or 10 tens of a μm) sheet of polymer material; the images may also be in greyscale or in color. There is no need to apply electrical signals during the production or use thereof.

15 Claims, 1 Drawing Sheet

(56) References Cited

U.S. PATENT DOCUMENTS 7,080,041 B2 * 7/2006 Nagel .............................. 705/51
8,107,143 B2 * 1/2012 Miyamoto et al. ................. 359/2
8,493,659 B2 * 7/2013 Suzuki et al. ............ 359/489.01

FOREIGN PATENT DOCUMENTS

| | | |
|---|---|---|
| EP | 2 085 799 | 8/2009 |
| JP | 2009-078418 | 4/2009 |
| WO | WO 2007/115663 | 10/2007 |
| WO | WO 2007/137334 | 12/2007 |
| WO | WO 2008/058670 | 5/2008 |
| WO | WO 2008/062620 | 5/2008 |
| WO | WO 2008/067932 | 6/2008 |
| WO | WO 2008/138539 | 11/2008 |

OTHER PUBLICATIONS

Yamaguchi et al. "Polarized latent image forming in liquid crystal devices using polymer surface photo-modification technique." (2004) *Proc. of SPIE* vol. 5618. pp. 166-173.

* cited by examiner

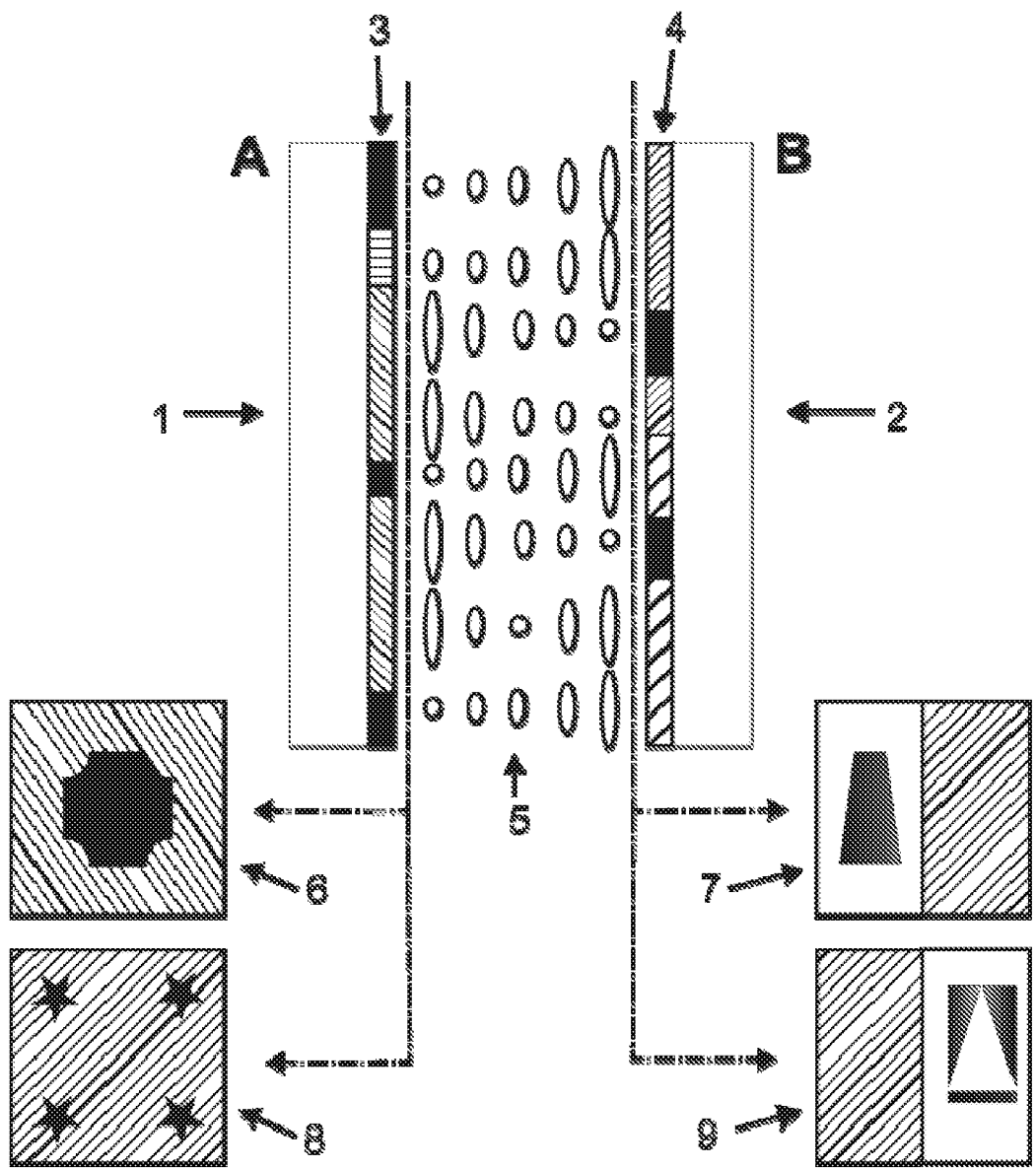

PROCEDURE AND DEVICE OF DOCUMENTAL SECURITY BASED ON GENERATION OF MULTIPLE IMAGES

This application is a National Stage Application of PCT/ES2010/000461, filed 12 Nov. 2010, which claims benefit of Serial No. P200931088, filed 1 Dec. 2009 in Spain and which applications are incorporated herein by reference. To the extent appropriate, a claim of priority is made to each of the above disclosed applications.

FIELD OF THE INVENTION

A new system for security and document authentication is described. The system is based on a transparent element on which more than one image is shown, depending on the way the element is observed. The system is based on cells or sheets of liquid crystal doped with one or more dichroic dyes. The images are obtained by means of a polarizer, and can be printed on a very thin sheet (μm or tens of μm) of polymer material. Moreover, the images can show grayscales or colors. Electric signals are not required either on manufacturing or in regular use.

BACKGROUND

The invention relies on new security techniques derived from iridescent and non-iridescent variable optical devices. More specifically the invention take advantage of some properties of liquid crystals whose usefulness in device security applications has been demonstrated: anisotropy, optical birefringence, the different phases that the liquid crystal can adopt, etc. When these properties are correctly manipulated, several optical effects are generated; these are easily verifiable by naked eye or by using simple optical elements.

Specifically, Rumiko Yamaguchi et al. in "Polarized latent image forming in liquid crystal devices using polymer surface photo-modification technique", 2004, Proceedings of SPIE Vol. 5618, pp. 166-173, propose to induce two orthogonal orientations on each confinement plate. This generates one black and white image on each plate, depending on the liquid crystal alignment with respect to the plane of the confinement plates and the polarizer orientation or the impinging light polarization.

However the device of Rumiko Yamaguchi et al. shows many drawbacks: the use of combined alignment techniques on the same surface (UV+buffing, UV+heat), the limitation to a maximum of two latent images per device, and the need of rigid external confinement plates that mar their integration in other elements such as documents, packaging or bank notes.

In document EP1894736-A2, Hoffmueller describes a model based on a liquid crystal featuring chiral behavior (liquid crystal molecules show orientational order and optical activity, generating a rotation of the light as it travels through). Two liquid crystal layers are placed on a support substrate, the second one being chiral. Interaction between the chiral layer and the first layer, whose molecules are partially oriented, generates a variable interlacing between layers that produces a color variation by the tilt/twist of the liquid crystal molecules. This technique produces two or more well-delimited regions having different colors. However, it has many drawbacks: no grayscale generation is provided, it employs a double layer of liquid crystals, color differences are only obtained in separate regions and the creation of high-resolution details or recognizable motifs is avoided. Moreover this technique hinders the generation of quadruple latent images (or even double latent images), and the elimination of external confinement plates.

WO2008058670-A1 proposes a device consisting of a liquid crystal cell structure inserted in the document that must be protected. The liquid crystal is a chiral nematic liquid crystal, and a linear light polarizer is attached to the "cell". The authentication of the verification element is checked with a verification unit including other linear polarizer that incorporates an emblem or any other motif as wished. When the liquid crystal is observed between the polarizers, a dark image of the emblem must be seen. Two important disadvantages of this technique, besides those cited in EP1894736-A2 are the need of including two linear polarizers for verification, and the need of a verification unit associated to one of the said polarizers.

WO2008067932-A3 proposes another device based on liquid crystal alignment (molecular alignment on the surfaces). The device features two alternatively repeated motifs generated by different molecular orientation depending on the zone. Homogeneous orientation is induced on one zone and homeotropic orientation is induced in other zone, so that they are, clearly visible through a linear polarizer. The drawbacks are: the requirement of two kinds of alignments (homogeneous and homeotropic) and a layer of inorganic material (aluminum or aluminum oxide). Moreover, no grayscale is available; color differences are restricted to regions and the creation of high-resolution details or just recognizable motifs is thwarted.

WO2008138539-A1 proposes an alternative for the security device to show complex patterns. The device is made of three superposed polymeric sheets: the first and third sheets are conveniently oriented polymeric liquid crystal; the second sheet is just an intermediate layer between the other sheets. Both oriented liquid crystal sheets give two latent visible images by means of a polarizer. Either image can be seen by rotating 90° the polarizer. Images are binary, i.e., with no grayscale. Main drawback: the manufacturing process is fairly complex (three polymeric sheets, stands . . . ); moreover, only a single latent image can be made visible with a linear polarizer; a 90° rotation of the polarizer undergoes a color inversion of the image.

JP20090 78418-A proposes a structure made of: a reflective layer, an intermediate layer and the liquid crystal layer where the latent image is formed by inducing two different alignments to the liquid crystal molecules according to a predetermined alignment pattern. All the layers are covered by a protective layer whose refractive index is matched with the index of the intermediate layer in the visible region. Main drawback: this structure has a single side and requires a reflective layer.

SUMMARY

The method proposed here achieves a polymerized liquid crystal sheet with several latent images on each side. The manufacturing procedure employs confinement plates that induce an alignment pattern onto a polymerizable liquid crystal doped with a dichroic dye. The resulting sheet will show two or more latent images when shined with polarized light from either side, or when the sheet is observed through a polarizer. Actually the use of the polarizer is not mandatory: the device works with partially polarized light such as a grazing reflection of a dielectric surface (bright floor, table). The unbalance of polarization components derived from the proximity of the Brewster angle is enough for the effect to show up. The effect can also be observed by placing the sheet in front of a standard liquid crystal display e.g. a PC computer.

The invention succeeds in obtaining a thin flexible sheet that contains a set of images. This sheet, upon insertion in a document, may be used to check its authenticity. Typically, the sheet looks dark and uniform. However, when partially polarized light impinges onto the sheet, one of the image sets becomes visible. The set is determined by the device side closer to the incident light. A second set of images is shown, for example, by slightly rotating the sheet. Other image sets become visible by shining the sheet on the opposite surface.

The manufacturing process of the new device includes a number of steps significantly different from the standard fabrication of liquid crystal displays.

The starting material is a polymerizable liquid crystal.

The polymerizable liquid crystal is doped with at least one dichroic dye.

Confinement plates are used. An alignment pattern with several orientations is imprinted onto the inner side of each plate. Alignment variation is parallel to the plane of confinement plates.

The sheet containing the latent images is achieved in several steps that are summarized as follows:

First, the liquid crystal is sandwiched between the confinement plates. The plates orient the liquid crystal according to the desired pattern.

Second, the liquid crystal is polymerized to fix permanently the orientational pattern.

Third, the polymerized liquid crystal sheet is extracted from the confinement sandwich. The resulting polymerized liquid crystal is a thin sheet containing the alignment.

The final transparent sheet will reveal one or several images when employing a polarized light source, a partially polarized light, or a polarizer.

If the alignment pattern of the confinement plates is different, a different set of images will become apparent depending on the side oriented towards the polarized light source or the polarizer.

The liquid crystal is doped with one or several dichroic dyes. The orientation of the liquid crystal—and consequently, of the dye—can be predetermined by conditioning the inner faces of the confinement plates employed in the sheet production.

Glass plates customarily employed as substrates in manufacturing of conventional liquid crystal displays are substituted in this invention by confinement plates. These confinement plates may be fabricated in any material, opaque or transparent, for they are used only during the fabrication process.

Another innovation introduced in this invention concerns the variations of liquid crystal orientation within the plane of confinement plates. Orientations are achieved by two procedures:

a) Using standard alignment techniques as employed in liquid crystal display manufacturing, but delimiting specific areas following a pattern. Standard display manufacturing usually seeks a uniform orientation upon the whole surface. In these devices, however, different orientations are generated on each surface. Eventually, once the liquid crystal is polymerized, the external confinement plates are removed, obtaining a thin flexible sheet.

b) Using interdigitated electrodes oriented in different directions on the plane of confinement plates. In this case, electric voltages must be applied during the manufacturing process (they are not required during the ordinary use of the device). Electrodes are made with photolithographic or micromechanical techniques, defining the required motif. Eventually a liquid crystal layer is deposited and voltage signals are applied to the electrodes to manage its orientation. This generates an In-plane Switching (IPS) effect by which the liquid crystal is reoriented. In this way, a multiple alignment able to reproduce the desired latent images is obtained. Once aligned, the liquid crystal is eventually polymerized in situ to create a permanent orientation pattern in the thin flexible sheet. Once polymerization is achieved, the voltage can be removed for the material keeps the predetermined orientation induced by the voltage distribution of the electrodes.

Multiple images are obtained by applying several treatments to the confinement plates. Treatments are applied to different points of each surface. Points are isolated to each other by several techniques: masks, photolithography, isolation barriers, selective deposition, thermal evaporation, inkjets, or any other standard microelectronic procedure.

In either case, homogeneous configurations are obtained in all cases. In these configurations, the liquid crystal molecules are always oriented parallel to the plane of confinement plates, though their specific orientation within the plane varies along the surface. This is the reason by which the areas become brighter or darker when shined with polarized light. Several independent images can be obtained on each side of the resulting doped liquid crystal sheet. The variation of orientation in the alignment direction allows the definition of a grayscale or even color images.

Finally, the liquid crystal polymerization allows the sheet—after being separated of the confinement plates—to be used independently in many applications; the latent images are already defined.

This application starts from a phenomenon already described in the literature mentioned above: the generation of two latent B/W images into a rigid device. A number of innovations have been added, transforming the phenomenon into a product that can be used as a documental security system. These innovations—where the claims derived from—are four:

1. Elimination of the external confinement plates in the final product. A liquid crystal polymerization procedure has been developed, allowing to keep the orientation induced by the plates when these are removed. The result is a thin sheet, able to keep the optical properties of the said cell. The thin flexible plastic sheet can be inserted in documents or packing cases. This sheet is the main innovation of the invention. The orientation of the liquid crystal is achieved in the monomeric form (reactive mesogen). The material is oriented and eventually polymerized. The external confinement plates become superfluous once the material is polymerized, allowing the extraction of the said material. The result is a sheet whose thickness is the predetermined distance between the confinement plates; this can be selected during the manufacturing process. The described effect has been tested in thin sheets from 2-100 µm; all of them are fully flexible. The effect is kept if the sheet is eventually encapsulated between protective layers, thus improving its performance in documental security devices.

2. Grayscale generation by two different methods, allowing the creation of complex images.

Inducing two orthogonal alignments in selected areas of the confinement plates, as previously described, generates a B/W image.

If a grayscale is desired, then other areas with variable orientations are induced in the plane of the confinement plates. Continuous or discrete non-linear orientations may be employed.

Continuous variation is obtained by varying the induced spatial orientation from 0° to 360°. For example, continuous variation is obtained with circular buffing on one plate; this produces a tangential alignment with respect to the rotation center.

Discrete orientations are obtained by selecting only a finite number of orientation directions. For example, simple grayscale images with three gray levels can be obtained by using alignments at 0°, 45°, and 90° with respect to the polarizer axis. Increasing the number of alignment angles increases the number of gray levels. A second example could be the overlapping of grayscale images, using mirrored alignments from the polarizer axis. This gives two images on each side. The contrast of either image can be further improved by using a quarter-wave retarder and a circular polarizer.

In the continuous case, molecules alignment direction shows a slight rotation from any point to any closest neighbor. The result is an easily identifiable pattern with a grayscale deployed in a semicircle. Radial buffing generates a similar continuously varying pattern, but the grayscale is inverted. Combining a circular buffing (tangential) on one plate and a radial buffing on the other plate, two easily identifiable non-figurative patterns are obtained.

In the discrete alignment case, a grayscale consisting of a given number of gray levels is generated. This is typically used in a format by areas, or to achieve figurative appearances.

On the other hand, complex high-quality grayscale images are generated using motifs engraved in external interdigitated electrodes. These electrodes are used once per sample. An electric field is applied between the interdigitated electrodes placed on one or both confinement plates. The liquid crystal is oriented switching on the plate plane, according to the applied field lines (In-plane Switching). Varying the orientation of the interdigitated electrodes conditions the eventual orientation of the liquid crystal, as in variable alignment techniques.

The liquid crystal is eventually polymerized and the resulting sheet is freed from the confinement plates. These confinement plates containing the electrodes can then be employed to generate the same motif on a new sample. This procedure is convenient for industrial manufacturing of these sheets, since the confinement plates—the most complex and expensive tool—can be reused.

3. Generation of multiple images. Given a light polarization orientation, or a polarizer axis, the same gray level is obtained by rotating the sample clockwise or counterclockwise. Therefore, the number of patterns or motifs induced by either plate can be doubled, actually generating a quadruple image. Two images become apparent by placing the polarizer in front of or behind the liquid crystal sheet as described above. The other two images are generated rotating the polarizer in either case. Alternatively, images can be separated using a quarter-wave retarder aligned with the sheet and a circular polarizer. Using motifs without grayscale, the two images on each side are shown independently. If the motifs include grayscale, the images overlap. The contrast of either image can be enhanced varying the orientation of the polarizer.

4. Color implementation by two different methods:

The grayscale may become a color palette by introducing an RGB matrix on the external side of the liquid crystal sheet after polymerization. The RGB matrix may be placed onto the inner surface of the above-mentioned protection polymer layer as well. The matrix must be placed so that the dark and bright dots generated by the sheet match the matrix pixels.

Alternatively, low and medium resolution color motifs can be generated by using dichroic dyes of different colors deposited onto specific areas of the liquid crystal sheet before polymerization. The dyes can be deposited by ink-jet printing or serigraphic masks. Dyes must be soluble in the liquid crystal. Once oriented and polymerized the monomer, dyes make the areas to vary between dark and colored states.

BRIEF DESCRIPTION OF THE FIGURES

FIG. 1 shows an example of device that includes:
Confinement plates (1 and 2)
Alignment patterns applied to the confinement plates (3 and 4)
Oriented liquid crystal molecules doped with the dichroic dye (5)
Latent image 1 on side A (6)
Latent image 2 on side A (8)
Latent image 1 on side B (7)
Latent image 2 on side B (9)

DETAILED DESCRIPTION OF THE INVENTION

The device is created from two confinement plates (1 and 2) conditioned by alignment patterns (3 and 4).

The liquid crystal layer doped with dichroic dye (5) is introduced between the plates after the desired alignment patterns are defined.

Selective induction of different alignments is achieved obtaining the desired motifs on sides A and B.

The generated motifs can be identified by shining the sheet with polarized light.

The alignment layer of side A (4) employs three alignment directions. According to the polarizer orientation one of two motifs (6 or 8) will become visible.

The alignment layer of side B (5) employs up to four alignment directions. Depending on the polarization direction of the impinging light, either one set of patterns (7) or a second set (9) will become visible.

INDUSTRIAL APPLICATION

This invention intends to be implemented as an element of documental security against bank note forging, or in authentication of documents, credit cards, checks, packing cases or any element whose intrinsic value make advisable its identification. Checking is done by observing the pattern with dark and bright areas that depend exclusively on the orientation of the liquid crystal at the input side. If the liquid crystal is parallel to the polarization, then the dye will absorb light, and a dark state will be obtained. If the liquid crystal is perpendicular to the polarization, then the dye will not absorb the light, and a bright state will be obtained. Switching the output side and the input side, the dark and bright areas will depend on their orientation in the other side. Therefore, an image can be induced by forcing the alignment of the corresponding areas on one of the sides. The other side may contain a different image, independent of the former one. The effect is observed maintaining the polarizer fixed and turning the cell upside down. Alternatively, the effect can be seen by keeping the cell fixed, and placing a polarizer behind or in front of the sheet.

The use of a polarizer is not strictly necessary for the effect to arise. The effect is perceived as well when the sample is shined with partially polarized light, like a grazing reflection coming from a dielectric surface like a polished floor or table.

This issue favors the ubiquitous implementation of the invention as a security element in labels or bank notes, for example.

The invention claimed is:

1. A procedure for manufacturing sheets having several latent images, fabricated from a polymerizable liquid crystal comprising:
   defining different areas on the inner face of at least one confinement plate;
   conditioning a plurality of alignment directions in the defined areas;
   doping the liquid crystal with at least one dichroic dye;
   placing the doped liquid crystal between two confinement plates;
   polymerizing the liquid crystal and extracting the sheet.

2. A method according to claim 1 wherein the step for defining areas in the confinement plates is carried out selectively on one or both inner sides of the confinement plates by one of the following procedures:
   photolithography;
   masks;
   physical barriers;
   selective deposition;
   thermal evaporation;
   ink-jet;
   or a combination of the above procedures.

3. A method according to claim 1, wherein the step of alignment conditioning is done in any direction parallel to a plane of said confinement plates, following an independent pattern for each plate, the alignment being achieved by at least one of the following procedures:
   mechanical buffing of a layer of alignment material;
   oblique deposition of alignment material;
   photoalignment of a photosensitive material;
   use of interdigitated electrodes on the confinement plates;
   or a combination of the above procedures.

4. A method according to claim 1, wherein the established alignments of at least two areas of the sheet are non-linear.

5. A method according to claim 4 wherein at least two conditioned alignments are orthogonal to each other.

6. A method according to claim 1, wherein a relative angle between conditioned alignments is determined in order to generate different gray levels in the latent image.

7. A method according to claim 1, further comprising adding an RGB color matrix to the latent images.

8. A method according to claim 7 wherein the color matrix is set by matching the areas defined in the sheet with the matrix pixilation on an external side of the already polymerized liquid crystal sheet, or the internal side of a protection polymer layer.

9. A method according to claim 1, wherein the doping step comprises depositing a plurality of different dichroic dyes on the determined areas of the confinement plates thus generating areas with different colors.

10. A device for documental security that comprising:
    a liquid crystal sheet doped with at least one dichroic dye distributed within the predefined areas through extractable confinement plates, in a way that the predefined areas maintain their orientation according to an alignment pattern that differ in an angle less or equal to 90° in at least one of a plurality of faces that form grayscale latent images that become visible when exposed to polarized light,
    a protection layer on both sides of the liquid crystal sheet protecting the device.

11. A device according to claim 10 wherein a plurality of dichroic dyes are distributed among the areas defined in the liquid crystal sheets generating different colors.

12. A device according to claim 10, wherein the device includes an RGB color matrix located between the liquid crystal sheet and the protection polymer layer.

13. A device according to claim 10, wherein the alignments have relative orientations at 0°, 45°, 90°, and 135° to generate two non-overlapping monochrome images on each side of the sheet.

14. A device according to claim 10, wherein mirror alignments referred to the polarizer axis are employed to generate overlapped images having grayscale.

15. A device according to claim 10, wherein the device further comprises two confinement plates that can be extracted and reused, conditioned to generate a pattern with different areas and orientations on the liquid crystal sheet.

* * * * *